United States Patent [19]
Hanson et al.

[11] Patent Number: 5,534,994
[45] Date of Patent: Jul. 9, 1996

[54] OPTICAL WAVEGUIDE SPECTRAL ATTENUATION USING AN OTDR

[75] Inventors: Thomas A. Hanson, Corning, N.Y.; William J. Kish; Jerome J. Novak, both of Wilmington, N.C.; Annette L. Vandervort, Corning, N.Y.

[73] Assignee: Corning Incorporated, Corning, N.Y.

[21] Appl. No.: 269,042

[22] Filed: Jun. 29, 1994

[51] Int. Cl.⁶ .................................................. G01N 21/27
[52] U.S. Cl. ............................................................ 356/73.1
[58] Field of Search ............................................. 356/73.1

[56] References Cited

U.S. PATENT DOCUMENTS

| | | | |
|---|---|---|---|
| 4,183,666 | 1/1980 | Tahara et al. | 356/73.1 |
| 4,737,026 | 4/1988 | Dalgoutte et al. | 356/73.1 |
| 4,737,027 | 4/1988 | Maeda | 356/73.1 |
| 4,838,689 | 6/1989 | Neumann | 356/73.1 |
| 5,032,025 | 7/1991 | Bateman | 356/73.1 |

OTHER PUBLICATIONS

"Spectral Attenuation Modelling with Matrix Methods", T. A. Hanson, Conference Digest, NPL Optical Fiber Measurement Conference, York, U.K. pp. 8–11, 1991.

Primary Examiner—Vincent P. McGraw
Attorney, Agent, or Firm—William Chervenak

[57] ABSTRACT

The present invention relates to a method of measuring spectral attenuation of an optical waveguide fiber using an OTDR. The spectral attenuation curve is generated by analyzing OTDR data taken at three or four wavelengths. There is particular interest in the wavelength range of 1200 nm to 1600 nm, which includes the operating windows about the wavelengths 1310 nm and 1550 nm. A particularly accurate spectral attenuation curve is obtained using OTDR measurements at 1310 nm, 1410 nm, and 1550 nm.

5 Claims, 6 Drawing Sheets

OPTICAL WAVEGUIDE SPECTRAL ATTENUATION USING AN OTDR

BACKGROUND

The invention relates to a method of measuring spectral attenuation of an optical waveguide fiber using an optical time domain reflectometer (OTDR). In particular, the spectral attenuation of the waveguide, over a selected wavelength range, is predicted from OTDR measurements at least at three selected wavelengths.

The unrepeatered distance over which an optical waveguide can transport information depends directly on the waveguide attenuation. Further, as the information rate has increased, the practice of increasing waveguide capacity by using wavelength division multiplexing has become common.

Thus the need has arisen to have accurate knowledge of the waveguide attenuation over a range of wavelengths defining an operating window and over a number of operating windows. That is, there is a need for an accurate measurement of waveguide attenuation over a wide range of wavelengths. A typical wavelength range is 1200 nm to 1600 nm, which includes an operating window around 1300 nm and another around 1550 nm.

However waveguide uses have extended over a wavelength range from about 700 nm to about 2000 nm. To obtain spectral attenuation for this wider range, which includes an operating window centered at about 850 nm, a set of lasers having appropriate center wavelengths which span a selected wavelength range must be chosen.

Waveguide attenuation measurements over a range of wavelengths, i.e., spectral attenuation, may be done using a laser at each wavelength of interest and measuring light power loss versus fiber length. A well known attenuation measurement method includes measurement of a reference fiber or a short cut back fiber. A ratio of power transmitted through the full length of a waveguide to power in the reference or short length fiber yields the power ratio which defines attenuation. Time consuming multiple measurements must be made. Furthermore, the number of lasers required makes the spectral attenuation measurement costly and more difficult to maintain. A preferred alternative to multiple laser sources is the use of a monochromator. A typical grating monochromator is capable of providing monochromatic light in steps of a few nanometers over a range of about 50% to 180% of the blaze wavelength. For example, a grating monochromator having a blaze wavelength of 1000 nm can in theory provide spectral measurements over a range from about 500 nm to about 1800 nm, although power output usually falls off near the ends of the operating range. A monochromator is costly and must be maintained in calibration.

A number of spectral measurement systems must be used to keep pace with the manufacturing rate. Hence, initial cost and maintenance cost is high.

Thus there is a need for a spectral attenuation measurement which is lower in maintenance cost, which shortens measurement time, reduces the number of measuring systems required and which does not require a monochromator or a large number of lasers.

SUMMARY OF THE INVENTION

The present invention meets the need for faster, lower total cost spectral attenuation measurement.

The invention is a method of measuring spectral attenuation of an optical waveguide fiber, over a selected wavelength range, using an OTDR.

OTDR attenuation measurements are made at least at three wavelengths which are within the selected range. The measured attenuations are analyzed to produce a curve representing attenuation, i.e., spectral attenuation, for the wavelengths of the selected range.

In an embodiment of the invention the selected wavelength range is from about 700 nm to about 2000 nm. This range essentially spans the wavelength range over which optical waveguides are at present used. In addition this range includes the wavelengths at which waveguide attenuation reach optimal low values.

In a preferred embodiment of the invention, the wavelength range is chosen to span the range from about 1200 nm to about 1600 nm. This range includes two optimal wavelength ranges of waveguide attenuation, i.e., a first range of about 1280 nm to about 1330 nm and a second range of about 1520 nm to about 1580 nm.

In another embodiment, three wavelengths are chosen for OTDR attenuation measurements. These three wavelengths are chosen front the respective ranges 1280 nm to 1330 nm, 1350 nm to 1420 nm, and 1520 nm to 1580 nm.

In a particular embodiment, three wavelengths, chosen From the three respective wavelength ranges, are 1310 nm, 1380 nm and 1550 nm. A preferred three wavelengths, chosen from the three respective wavelength ranges, are 1310 nm, 1410 nm and 1550 nm. In the preferred case, 1410 nm is used because the waveguide attenuation is lower as the wavelength moves away from the water peak at 1380 nm. Thus the signal to noise ratio is better at 1410 nm allowing measurement of longer waveguide fiber lengths. Also, it was found preferable to characterize the 1380 nm ⁻OH peak using a wavelength above 1380 nm. Given the tolerance on laser wavelength and the possibility of laser wavelength drift, 1410 nm is preferred.

Other aspects and advantages of the invention will be apparent from the detailed description and the following drawings.

DETAILED DESCRIPTION OF THE INVENTION

Figure 1:
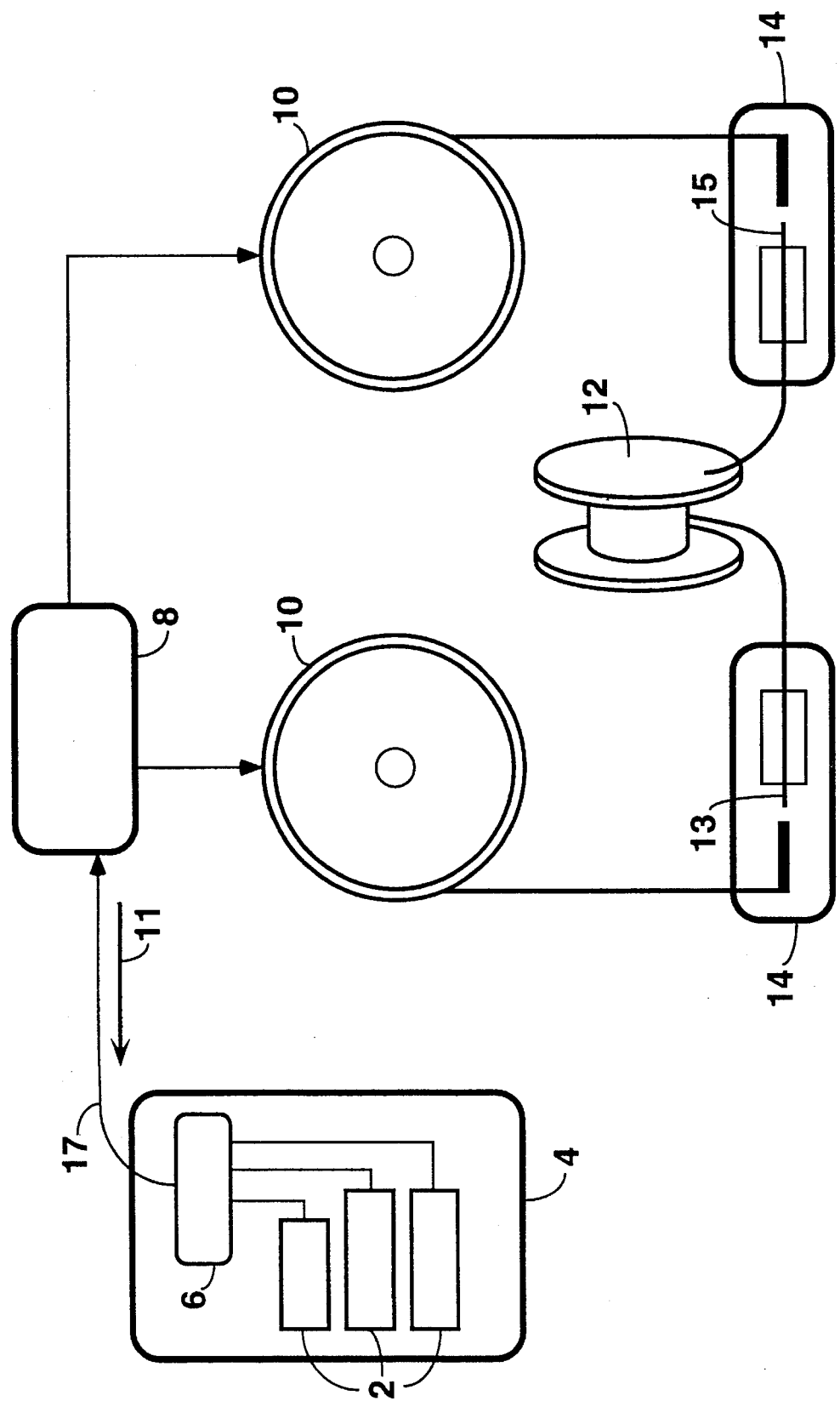
FIG. 1 is a schematic view of a OTDR measurement system using at least three lasers.

The drawings are intended to aid in describing the invention and in no way limit the invention. Except where indicated, the drawing are not necessarily to scale.

An OTDR is now capable of measuring optical waveguide attenuation with sufficient accuracy to meet specified tolerances, i.e., at least ±0.01 db/km. Over the operating windows centered at 1310 nm and at 1550 nm the OTDR accuracy is about ±0.003 dB/km. State of the art OTDR instruments can achieve this accuracy for fiber lengths in excess of about 50 km. The OTDR has achieved acceptable accuracy and range, in large part, due to development of better OTDR signal interpretation techniques and the improvement in the sensitivity of OTDR instrument.

The OTDR operating principle is well known in the art. FIG. 1 shows the main features of a production OTDR instrument having the at least three lasers necessary to practice the inventive method. The OTDR, indicated by enclosure 4, contains the at least three laser sources 2. The lasers may be chosen to provide spectral attenuation for any segment of the wavelength range over which optical waveguides are used. At present that range extends from about 700 nm to about 2000 nm.

In a preferred embodiment of the inventive method, the lasers 2 are three in number and have operating wavelengths 1310 nm, 1410 nm and 1550 nm, respectively. While only three lasers have been shown, it is understood that lasers 2 represent a plurality of lasers. Laser sources are fully characterized for center wavelength, wavelength width and power output before use. Typically laser manufacturing processes can meet a specified center wavelength to about ±10 of target. This tolerance is acceptable for lasers used in this invention except for those used near the 1380 nm ⁻OH peak. As stated above and noted below, a preferred embodiment of the invention requires these lasers to be above 1380 nm, i.e., on the side of the peak having the lower magnitude of slope.

The laser light may be launched into a waveguide fiber through fiber optic switches 6 and 8. Switch 6 selects a laser for a particular measurement and switch 8 selects the launch end of the fiber being measured. The embodiment shown includes bi-directional measurements. A set of optical switches which may be automated are also shown. The bi-directional method may be operated in a manual mode. Furthermore, a uni-directional measurement with no automatic switching may also be employed. The bi-directional, multiple wavelength measurement may be automated by using a machine control device, such as a computer, to move the switches to their proper positions as the measurement proceeds.

Arrow 17 indicates light from a particular laser passing through switch 8 to either waveguide fiber end 13 or 15. The laser light is continuously reflected back to the OTDR, as indicated by arrow 11, as laser light propagates through the fiber length. The OTDR contains a coupler, not shown, which directs reflected light to a detector, also not shown. Once a trace of back reflection intensity versus distance along the waveguide has been recorded for light launched into one fiber end, the position of switch 8 is changed and an intensity trace is obtained for light launched into the other fiber end. After bi-directional traces have been recorded for one of lasers 2, switch 6 is positioned to launch light from another of lasers 2. The measurement is completed when two uni-directional OTDR traces are combined to form a bi-directional trace at each laser wavelength. As an alternative one or more OTDR traces obtained for one launch direction in the fiber may be used in the determination of waveguide attenuation. The sequence in which lasers and launch directions are chosen is not material to the invention.

One or more OTDR traces, obtained at a particular wavelength, yields waveguide attenuation at that wavelength. The attenuation is usually expressed in units of dB/km.

In FIG. 1, note that wound lengths of fiber 10 may be interposed between switch 8 and an end of the waveguide to be measured. Fibers 10 serve to move the high intensity, first reflected light pulse away from the end of the waveguide to be measured. This first high intensity reflected pulse saturates the detector, thereby producing a dead zone at the launch end of a waveguide fiber. The longest dead zone is located in one of the waveguide fibers 10 which are nearest the OTDR laser. Thus a trace having a shorter dead zone is obtained for the length of the waveguide being measured. From a bi-directional averaged OTDR trace or form one or more uni-directional at a particular wavelength the fiber attenuation may be determined at that wavelength by a two point or other fit technique. The applicable methods are well known in the art.

The waveguide fiber being measured is shown wound on reel 12. For certain types of fiber, reel 12 may be a shipping reel, eliminating the need for a special measurement reel and an extra winding step.

To obtain a curve of waveguide attenuation over a selected wavelength range, i.e., a spectral attenuation curve, the individual attenuations measured at each laser wavelength are combined with the known coefficients, which are characteristic of a particular waveguide fiber type and which relate predicted to measured attenuation. That is, the spectral attenuation of a particular waveguide fiber may be related to the attenuation of the particular waveguide fiber measured at a set of at least three wavelengths by means of a set of coefficients previously determined for the particular waveguide fiber. An alternative statement is, the relationship of the measured attenuations to points on the spectral attenuation curve may be expressed as a set of coefficients characteristic of the particular type of waveguide under test. The number of sets of coefficients determines the spacing of points on the spectral curve. A set of coefficients is required for each fiber type. For a more detailed discussion of generation of the coefficients reference is made to, "Spectral Attenuation Modelling with Matrix Methods", T. A. Hanson, Conference Digest NPL Optical Fibre Measurements Conference, York, the United Kingdom, pp. 8–11, 1991.

The coefficients may be generated using any of a number of methods known in the art for predicting a curve from individual data points. For example, the curve may be generated using a regression method based on minimizing the summed squared differences.

Experimentation was completed to test the concept wherein the spectral attenuation predicted from a three or four wavelength measurement was compared to the spectral attenuation measured using a standard cut-back method and standard equipment which included a monochromator to provide light of different wavelengths. These tests are shown in examples 1–4.

After the concept was proven and appropriate sets of wavelengths were determined, experimentation continued using an OTDR incorporating the proper lasers. A typical result of these tests is shown in example 5.

A typical spectral attenuation curve generated using this standard method provided a data point about every 10 nm over a selected wavelength range.

EXAMPLE 1

Four Wavelength OTDR Simulation

A spectral attenuation curve was measured on 24 single mode fibers using a standard cut-back method with monochromator. Measurements were taken every 10 nm over the range 1240 nm to 1600 nm. The sets of coefficients, described above were generated from these data using a least squared error regression for which the measured spectral attenuation curve was taken as the base, as discussed above.

The attenuation of each of the same 24 single mode fibers was measured at the wavelengths, 1310 nm, 1360 nm, 1410 nm and 1550 nm. A spectral attenuation curve, over the wavelength range 1240 nm to 1600 nm, was generated from these four data points using the set of coefficients characteristic of the waveguide fiber type measured.

The lower limit of this range, 1240 nm, was chosen because the $^-$OH absorption near 1240 nm effectively limits the low wavelength end of the operating window for an installed system.

Figure 2:
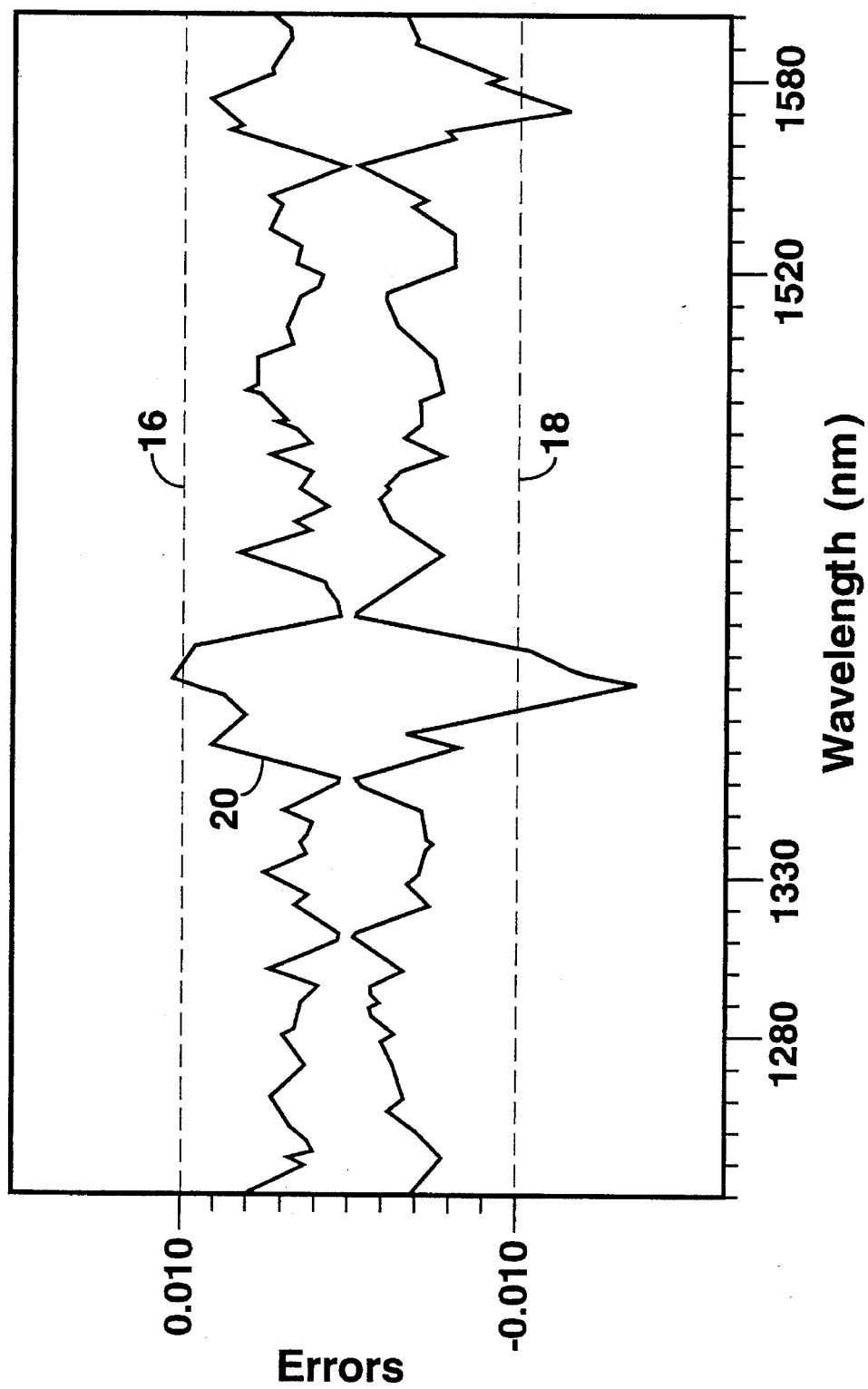
FIG. 2 is a chart comparing simulated four laser OTDR spectral attenuation to spectral attenuation measured using a standard cut back method.

FIG. 2 is a chart of the difference or error between the predicted spectral attenuation and the standard method cut back spectral attenuation. Curves 20 are the envelope of the 24 difference plots. Essentially the entire envelope lies within the boundaries 16 and 18 at 0.01 and −0.01 dB/km respectively.

Over the operating windows 1280 nm to 1330 nm and 1520 nm to 1580 nm, the envelope is substantially within the range ±0.005 except for an excursion near 1580 nm.

Thus, given the accuracy of an OTDR, the spectral attenuation curve predicted by OTDR measurements would be sufficiently accurate to characterize waveguide fiber performance.

COMPARATIVE EXAMPLE 2

Three Wavelength OTDR Simulation

The 24 fibers of example 1 were measured at the wavelengths 1310 nm, 1550 nm and 1380 nm and a spectral attenuation curve was predicted.

Figure 3:
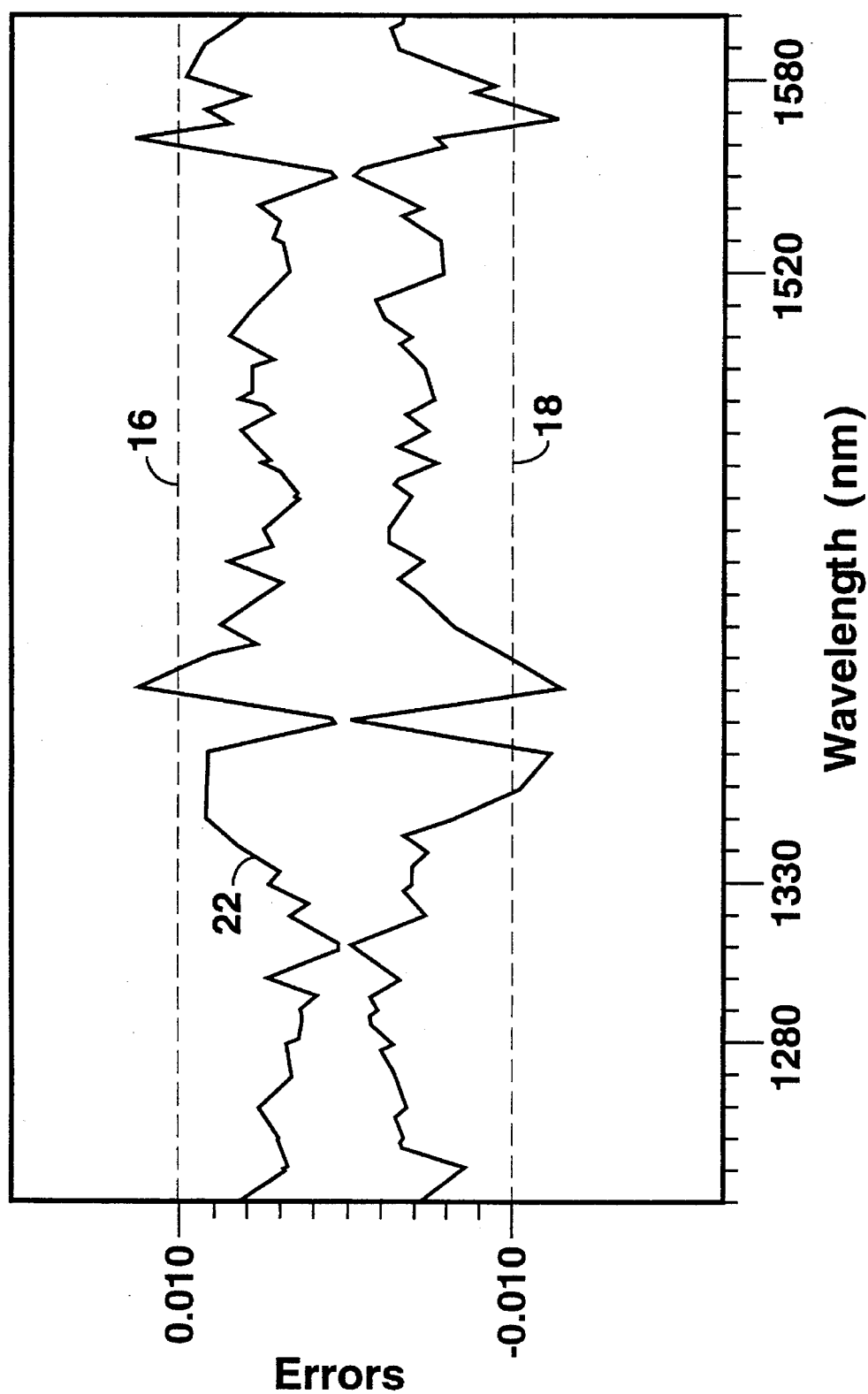
FIG. 3 is a chart comparing simulated three laser OTDR spectral attenuation to spectral attenuation measured using a standard cut back method.

FIG. 3 is the difference plot analogous to that described in example 1. Curves 22 are the envelope of the 24 difference plots. Here again the envelope is essentially contained within the boundaries ±0.01 dB/km shown by lines 16 and 18.

Furthermore, comparing FIGS. 2 and 3 over the operating windows 1280 nm to 1330 nm and 1520 nm to 1580 nm, there is excellent agreement between the three wavelength and the four wavelength OTDR difference charts.

Combining the results of examples 1 and 2, the conclusion is drawn that a satisfactory spectral curve can be generated using a wavelength from the 1310 nm window, a wavelength from the 1550 nm window and a wavelength descriptive of the 1380 nm $^-$OH peak. Thus, a satisfactory OTDR spectral attenuation may be generated from measurements at three wavelengths where the three wavelengths are chosen from the respective ranges 1280 nm to 1330 nm, 1350 nm to 1420 nm, and 1520 nm to 1580 nm.

COMPARATIVE EXAMPLE 3

Three Wavelength OTDR Simulation

A spectral attenuation curve was generated using attenuation measurements at three wavelengths. As in example 2, two of the wavelengths chosen were 1310 nm and 1550 nm. The third wavelength was chosen from the group consisting essentially of 1380 nm, 1390 nm, 1400 nm, 1410 nm, 1420 nm, 1430 nm, 1440 nm, and 1450 nm.

Figure 4:
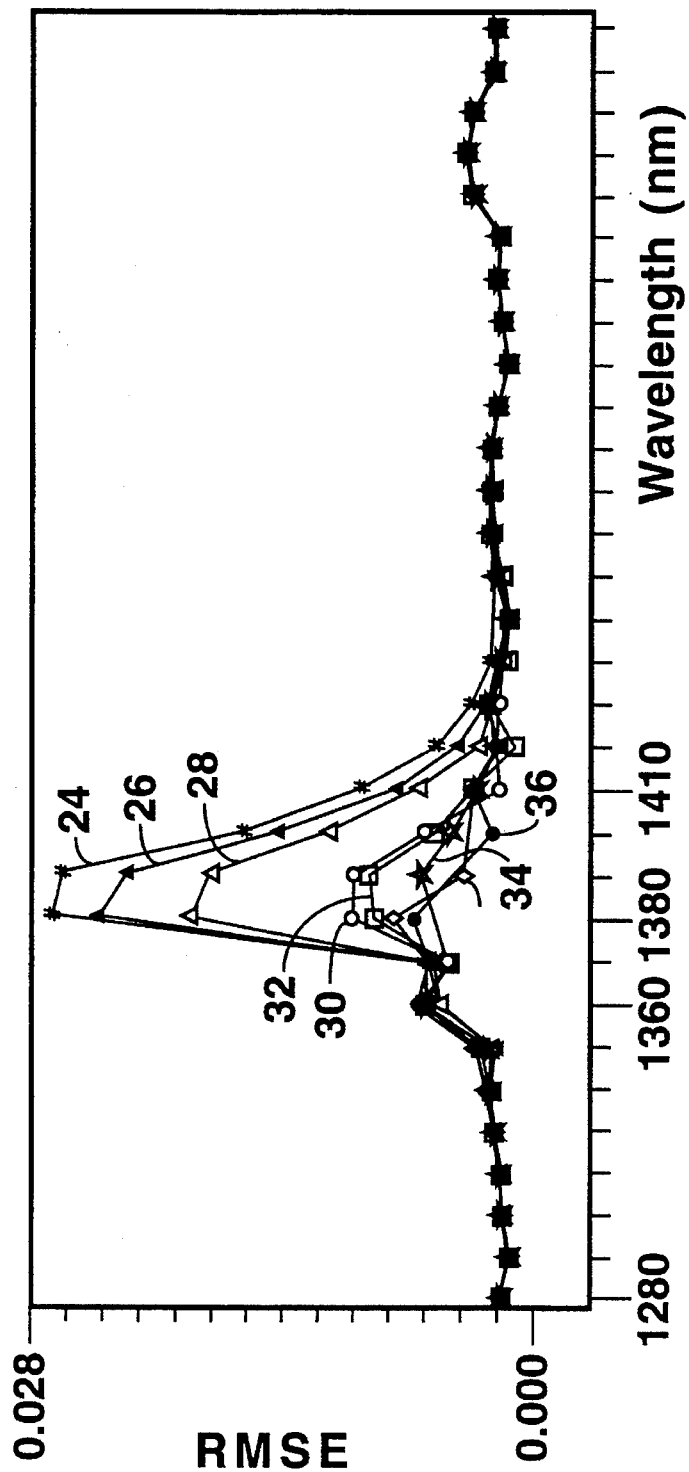
FIG. 4 is a chart comparing simulated three laser OTDR spectral attenuation to a standard cut back method wherein two OTDR laser wavelengths are 1310 nm, 1550 nm and the third OTDR laser is in the wavelength range 1380 nm to 1450 nm.

FIG. 4 shows comparison of the root mean square error for the spectral attenuations predicted from the three wavelength attenuation measurements. Root mean square error is calculated relative to the spectral curve measured by standard techniques. Curve 24 represents the error for the wavelength group 1310 nm, 1550 nm and 1450 nm. Curve 26 represents the error for the wavelength group 1310 nm, 1550 nm and 1440 nm. Curve 28 represents the error for the wavelength group 1310 nm, 1550 nm and 1430 nm. Curve 30 represents the error for the wavelength group 1310 nm, 1550 nm and 1420 nm. Curve 32 represents the error for the wavelength group 1310 nm, 1550 nm and 1410 nm. Curve 34 represents the error for the wavelength group 1310 nm, 1550 nm and 1380 nm. And curve 36 represents the error for the wavelength group 1310 nm, 1550 nm and 1390 nm.

Over the operating windows 1280 nm to 1330 nm and 1520 nm to 1580 nm, the error curves essentially coincide. Further, over the entire wavelength range 1280 nm to 1600 nm the curves 30, 32, 34 and 36 essentially coincide.

The preferred three wavelength group was taken as 1310 nm, 1550 nm and 1410 nm. The wavelength 1410 nm is close enough to the 1380 nm $^-$OH absorption peak to describe attenuations near the peak accurately. Also, because 1410 nm is slightly away from the $^-$OH peak, the signal to noise ratio of the OTDR measurement is improved. Further, the choice of 1410 nm allows for some variance of center wavelength as supplied by a laser manufacturer and for some possible laser wavelength drift with temperature.

In a separate experiment, it was found that wavelengths near the $^-$OH peak but slightly above 1380 nm more accurately described the peak than wavelengths slightly below 1380 nm. This further reinforces the choice of 1410 nm.

EXAMPLE 4

Simulated Comparison of Three versus Four Wavelength OTDR

A spectral curve was generated using attenuation measurements at 1310 nm, 1360 nm, 1410 nm and 1550 nm. This curve was compared to spectral attenuations generated using attenuation measurements at 1310 nm, 1380 nm and 1550 nm and at 1310 nm, 1410 nm and 1550 nm, respectively.

Figure 5:
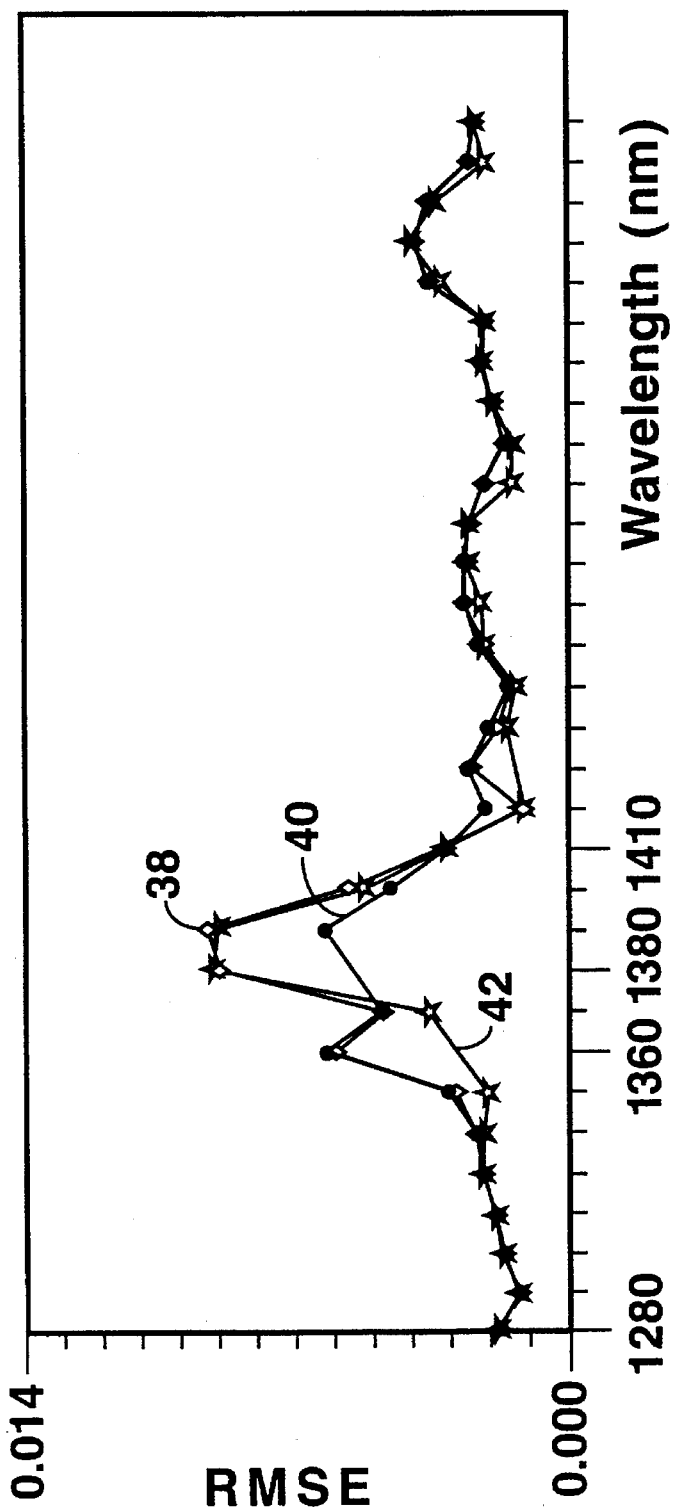
FIG. 5 is a chart comparing simulated spectral attenuation measured using a three laser OTDR to that measured using a four laser OTDR.

The differences, expressed as root mean square error from a standard measured spectral curve, are shown in FIG. 5. Curve 40 is the error for OTDR measurements using the three wavelengths 1310 nm, 1380 nm and 1550 nm. Curve 42 is the error for the four wavelengths 1310 nm, 1360 nm, 1410 nm and 1550 nm. Curve 38 is the error for the three wavelengths, 1310 nm, 1410 nm, and 1550 nm.

All three curve are essentially identical for the two operating windows 1280 nm to 1330 nm and 1520 nm to 1580 nm. Also, the four wavelength curve 42 is essentially equal to the three wavelength curve 38. Thus the extra measurement at 1360 nm, lower in wavelength than the 1380 nm $^-$OH peak, provides essentially no additional information about spectral attenuation over the three wavelength measurement method.

EXAMPLE 5

Three Wavelength OTDR Spectral Attenuation

The simulations of examples 1 through 5 gave the optimum number and spectral positions of wavelengths for predicting spectral attenuation.

An OTDR was equipped with three lasers at the respective wavelengths 1310 nm, 1410 nm and 1550 nm. OTDR measurements at these three wavelengths were made on each of seven single mode fibers. A spectral attenuation curve was generated using the coefficients, characteristic of the fiber type, which relate the three measured attenuations to attenuations at other wavelengths.

The generated spectral curve covered the wavelength range from 1280 nm to 1600 nm in 10 nm steps. Measurements were made on these seven fibers over this same wavelength range in 10 nm steps using a standard cut back method and well known apparatus including a monochromator.

Figure 6:
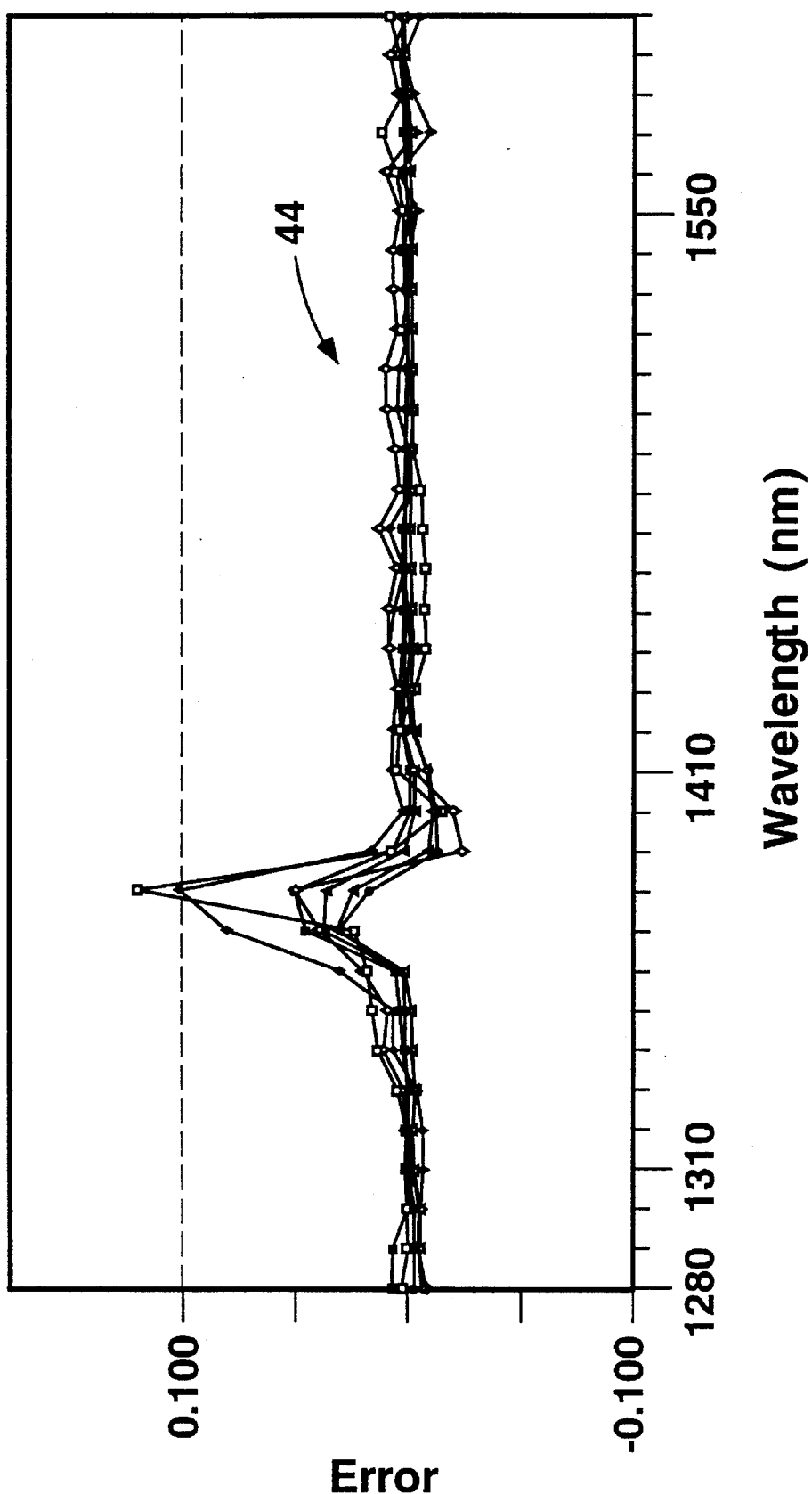
FIG. 6 is a chart comparing actual three laser OTDR spectral attenuation to a spectral attenuation obtained by direct measurement using a standard cut back method.

Curves 44 of FIG. 6 shows the difference or error between the OTDR spectral attenuation and the cut back spectral attenuation. There is excellent agreement between the two spectral attenuations for all seven waveguide fibers measured. The largest error, about 0.1 dB/km, occurred near the 1380 nm $^-$OH absorption peak. Over the operating windows 1280 nm to 1330 nm and 1520 nm to 1580 nm the error is less than about 0.002 dB/km.

The present invention therefore provides a method of measuring spectral attenuation which, when compared to a standard cut back measurement, is:

at least equal and probably superior in accuracy;

better suited to a production environment;

faster;

lower in equipment cost;

lower in maintenance cost; and portable.

Although specific embodiments of our invention have hereinbefore been disclosed and described, it will be understood that the scope of our invention is nevertheless to be defined by the following claims.

What is claimed is:

1. A method of measuring spectral attenuation of an optical waveguide fiber, for a selected wavelength range, using an optical time domain reflectometer, comprising the steps of:

Measuring attenuation at these selected wavelengths which are substantially 1310 nm, 1410 nm, and 1550 nm; and, analyzing the respective attenuations at said at least three wavelengths to produce a curve representing attenuation over the selected wavelength range.

2. A method of measuring spectral attenuation of an optical waveguide fiber, for a selected wavelength range, using an optical time domain reflectometer, comprising the steps of:

measuring attenuation using an optical time domain reflectometer at least at three wavelengths each of which is within the selected wavelength range, wherein two of said at least three wavelengths are taken from the ranges 1280 nm to 1330 nm and 1520 nm to 1580 nm, and one wavelength is substantially 1410 nm and analyzing the respective attenuations at said at least three wavelengths to determine attenuation over the selected wavelength range.

3. The method of claim 2, wherein the selected wavelength range is from about 700 nm to about 2000 nm.

4. The method of claim 2, wherein the selected wavelength range is from about 1200 nm to about 1600 nm.

5. The method of claim 2, wherein three wavelengths are selected and the three selected wavelengths are substantially 1310 nm, 1410 nm, and 1550 nm.

\* \* \* \* \*